United States Patent [19]
Szuch

[11] 4,309,954
[45] Jan. 12, 1982

[54] SELF ADJUSTING DEVICE FOR MOORING BOATS

[76] Inventor: A. William Szuch, 506 Lakepark Rd., Curtice, Ohio 43412

[21] Appl. No.: 57,703

[22] Filed: Jul. 16, 1979

[51] Int. Cl.³ .............................................. B63B 21/00
[52] U.S. Cl. ................................................. 114/230
[58] Field of Search ......................... 114/230; 119/120

[56] References Cited

U.S. PATENT DOCUMENTS

| | | | |
|---|---|---|---|
| 507,835 | 10/1893 | Oppenheimer | 119/120 |
| 2,581,676 | 1/1952 | Loaney | 114/230 |
| 3,108,563 | 10/1963 | Wurdack | 114/230 |
| 3,830,187 | 8/1974 | McGahee | 114/230 |
| 4,022,450 | 5/1977 | Smith, Jr. | 114/230 X |

Primary Examiner—Sherman D. Basinger
Attorney, Agent, or Firm—George R. Royer

[57] ABSTRACT

A docking and mooring device for water borne vessels, such device being structured to automatically adjust for water level variations and conditions alongside the mooring location. The device comprises one or more vertically positioned structures on which are mounted pulley systems, with each vertically disposed pulley system encompassing a closed looped line; said closed loop line being indirectly tied to a portion of the moored boat. Such closed loop on each pulley system is vertically disposed and drawn over upper and lower disposed pulleys, so that such closed loop can be freely moved up and down with water level variations or changes in water conditions, and with the vessel being indirectly tied to said closed loop, the vessel itself will also move up and down with said conditions.

1 Claim, 6 Drawing Figures

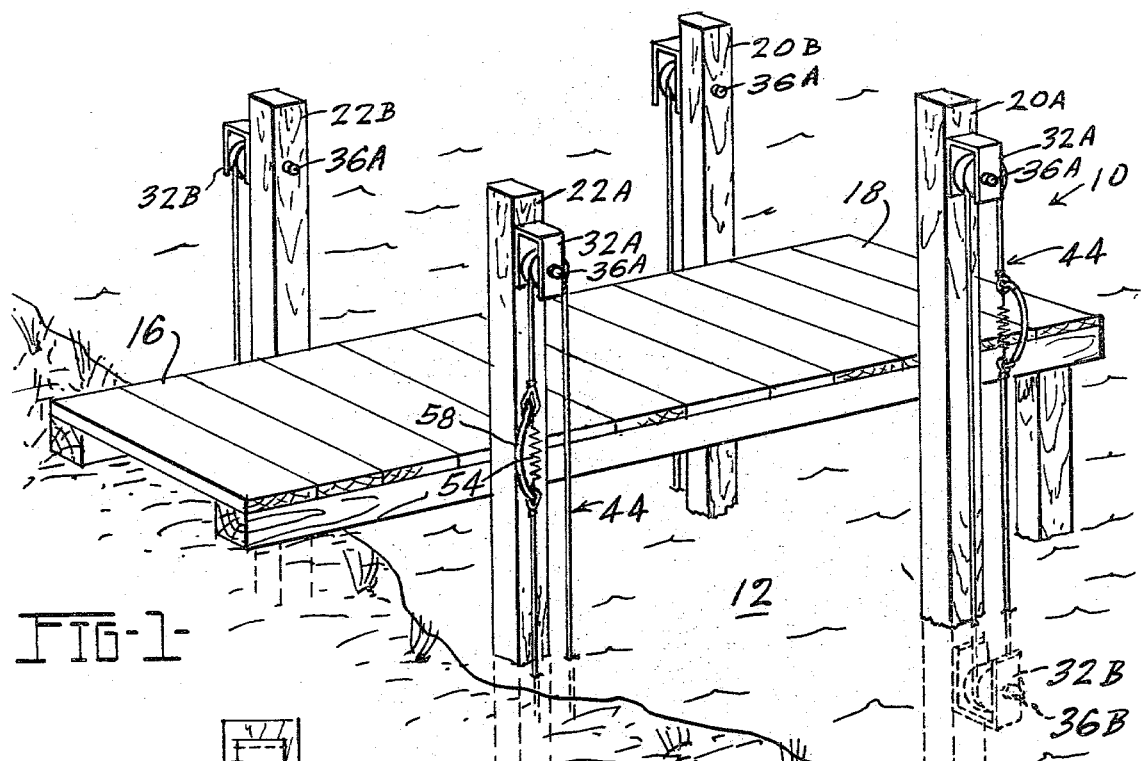
FIG-1-
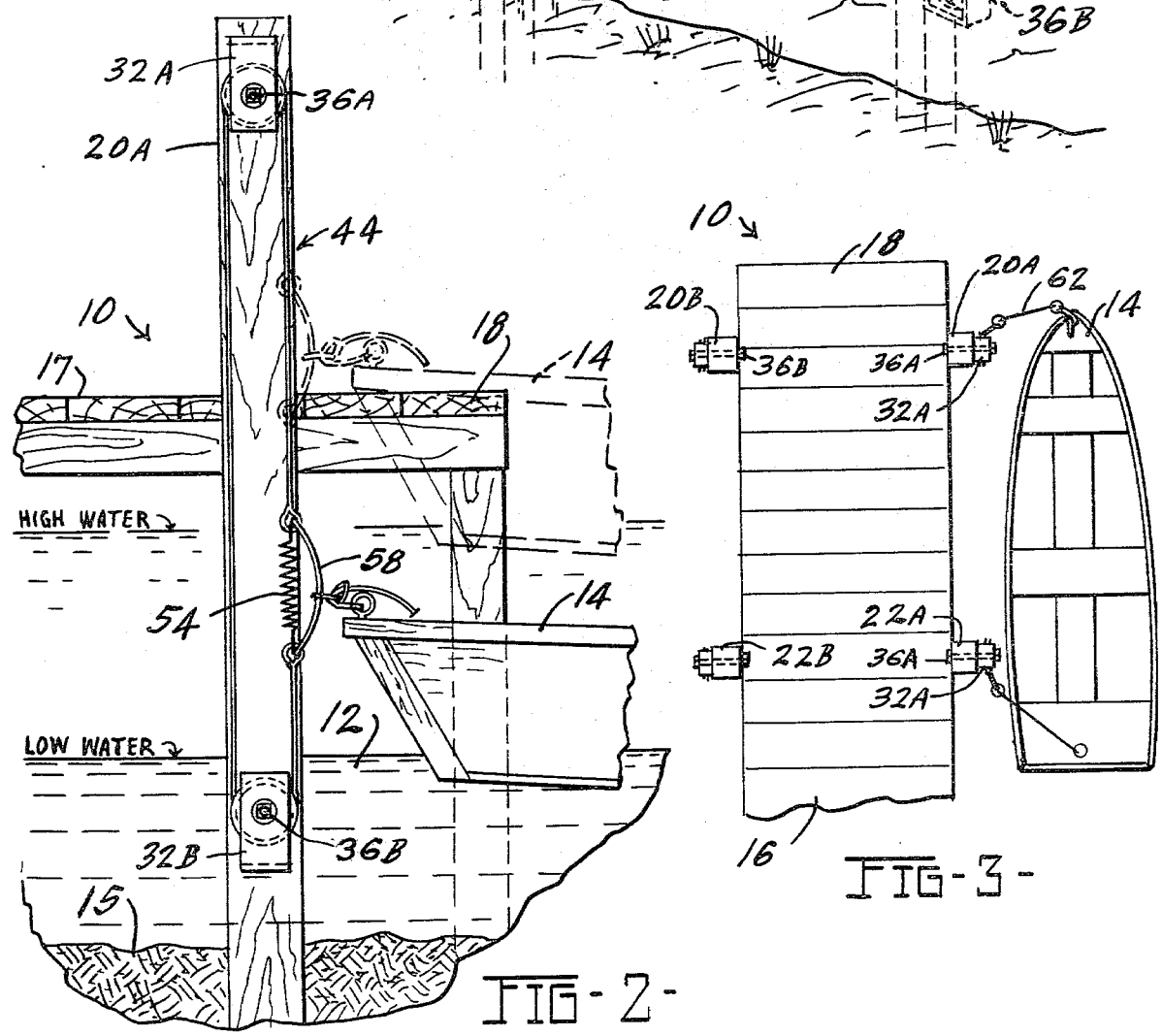
FIG-2-
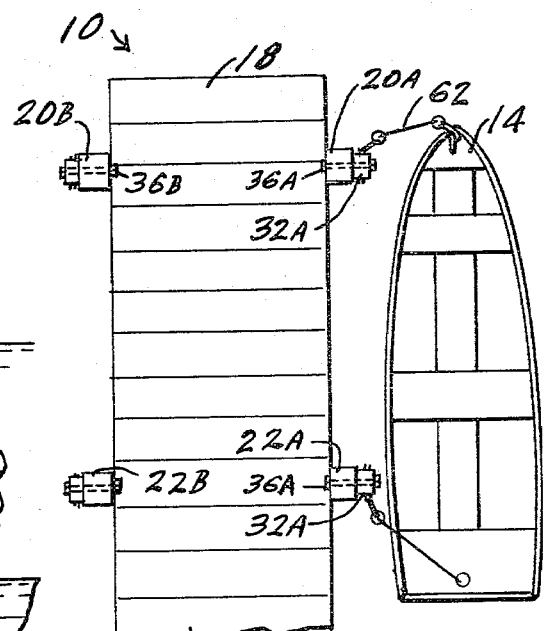
FIG-3-

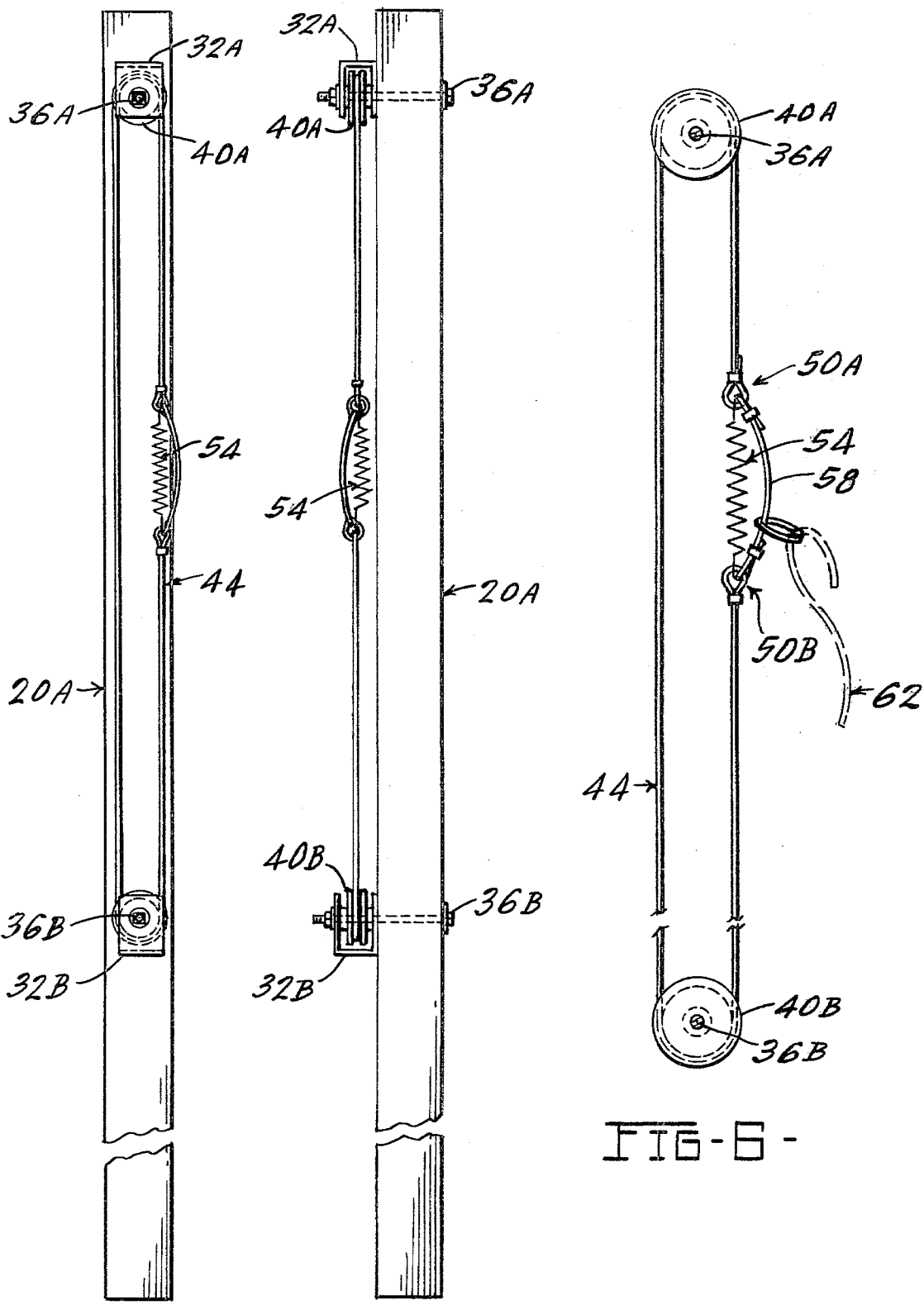

SELF ADJUSTING DEVICE FOR MOORING BOATS

BACKGROUND OF INVENTION

This invention relates to the art and science of mooring boats and ships alongside a pier or a dock of fixed disposition. More specifically, the subject invention pertains to a device and corresponding structure for tying and mooring boats alongside a pier or dock where the vagaries of the local body of water cause erratic and undulating wave actions or periodic rise and fall movements of the water levels, such as tides and other natural or man-made phenomenon.

In this latter respect, one of the myriad problems encountered with mooring a boat alongside a dock is the incessant need to vary the positions and length of mooring lines in order to compensate for water level variations that may occur because of such tidal variations, weather conditions, or other attendant causative factors. This process may entail, on the one hand, of slacking the lines a sufficient distance to allow for the water level changes. Alternatively, the lines may need to be adjusted inwardly for the possibility of violent or relatively severe wave action to insure that the boat does not sway or swing too much from the pier, and thereupon cause possible damage to the boat and the dock. In all such situations, discretion must be exercised to allow just enough slack in the lines from the dock to the vessel so as to allow for rapid fluctuation in the water level and yet optimally minimize the amount of necessary line to inhibit unnecessary movement of the boat.

Thus as can be seen, in this procedure of adjusting mooring lines, unless the water body in which the dock is located is ideally protected and is not subjected to much in the way of water level variations, there is a constant requirement of ascertaining whether the mooring lines are properly adjusted. Where attention must be given to tidal variations, and the like several such adjustments in the course of a day may be required. Periodic rough weather will also require such close attention and this process can be very demanding and time consuming, as well as being laborious. Clearly, one of the problems encountered with this frequent adjustment of lines is the constant attention mandated by such action. Obviously, one cannot be constantly present at the docked vessel to make these mooring adjustments, and thus, there is a need for some structural solution in the mooring arrangment which minimizes this attention required.

The subject invention herein is conceived and directed as a solution to the foregoing problems.

OBJECTS

In view of the foregoing, the following are objects of the subject invention:

It is an object of the subject invention to provide an improved docking device for water borne vessels;

Another object of the subject invention is to provide an improved device for mooring water borne vessels to a dock situated in water bodies that experience water level variations;

Yet another object of the subject invention is to provide an improved device for automatically adjusting mooring line requirements to variable water levels in vessel mooring;

Still another object is to provide an improved boat docking system that minimizes the need for constant surveillance in the boat mooring procedure;

Another object of the subject invention is to provide an improved mooring structure;

A still further object of the subject invention is to provide a self-adjusting and resilient ship mooring device;

Yet another object is to provide an improved device for docking small boats;

Another object of the subject invention is to provide an improved mooring device for waterborne vessels;

Other and further objects of the subject invention will become clear upon a reading of the following specifications taken in conjunction with the following drawings:

DRAWINGS

In the drawings:

FIG. 1 is a perspective view of a dock incorporating the subject invention;

FIG. 2 is a side elevational view of the subject device;

FIG. 3 is a top elevational view of a dock incorporating the subject invention;

FIG. 4 is another side elevational view of the subject invention;

FIG. 5 is an end elevational view of the subject invention;

FIG. 6 is a side elevational view of the subject invention showing the detail of the closed loop system over the upper and lower pulleys.

DESCRIPTION OF GENERAL EMBODIMENT

The subject invention is an automatically adjusting boat leveling device for vessel docking or mooring alongside a conventional pier or dock. The invention is comprised of a plurality of vertical support members integrally affixed along the water side of the pier or dock at which the vessel is docked. Each such vertical support member is equipped with pulley members respectively on the upper and lower ends thereof, and drawn over the two respective pulleys is a closed loop of mooring line comprised of any type of material. This closed loop is thus capable of moving in a closed path up and down in the resultant vertical path defined between such pulley members. On a portion of the closed loop that is exposed towards the vessel is a connecting member that can be either appended directly to the vessel, or alternately can be connected to a relatively short intermediate mooring line leading to and connected to a portion of the moored boat.

The invention envisions and encompasses the use of a multiple number of such vertically disposed mooring members, and the precise number will be dependent on either the size of the vessel or the number of locations that it is desired to connect the boat to the system for optimal mooring purposes.

DESCRIPTION OF PREFERRED EMBODIMENT

Referring now to the drawings for a description of a preferred embodiment of the subject invention, FIG. 1 shows a conventional boat dock 10 of lontitudinally extending disposition. Such boat dock 10 projects horizontally out and above upper water surface 12, and the distance of such projection is generally made commensurate with the desired docking space for one or a number of boats. As shown in FIG. 1, the boat dock 10 shown is basically conventional and is adapted for mooring only one boat 14 alongside, (as shown in FIGS. 2 and 3) however, it must be indicated that the scope of the subject invention herein extends to docks or piers of substantially larger proportions for mooring several vessels or for mooring ocean-going ships and the like. Thus, for instance, with proportional adaptations the structural principles of the subject invention can be made generally applicable to mooring large ships alongside piers or dock parallel to the waterfront or for mooring several vessels end to end. Nonetheless, the structural principles herein are described as being principally applicable to small boat docks for mooring a boat 14 thereto as shown in FIG. 2. However, stress must be made that this invention is generally applicable to boats and vessels of all sizes and shapes and docks or fixed berthing structures of all types and sizes.

As shown in FIGS. 1 and 3, each side of dock 10 is equipped with a plurality of vertically extending support pillers 20A; 20B, . . . 22A, and 22B all of generally conventional construction. Support pillars 20A and 20B are situated on the right side of the dock 10, as looking out to the water end 18 of dock 10, while pillars 22A and 22B are affixed to the left side. The number of support pillars for the dock 10 or any dock is generally dependent on the length and size of the dock or the size and weight of the moored vessel and the number of pillars used and described herein is only exemplary. Said pillars 20A, 20B . . . 22A and 22B are driven into the bottom earth 15 surface of the water body 12 for rigid support purposes. The horizontal portion of dock 10 is appended or affixed on its sides to inner portions of said support pillars, as shown. The inner or land end 16 of the dock 10 is usually affixed in some integral fashion to the land so that there is continuity between the land and the dock. Thusly, constructed, dock 10 is of conventional structural arrangement.

It must be noted that the relative vertical positioning of the support pillars 20A, 20B, 22A, and 22B is such that the upper ends thereof generally extend above the upper surface 17 of dock 10, as shown. Moreover, the relative positioning and height of the support pillars 20A, 20B, 22A, and 22B and dock 10 is usually determined by the average water level at the pier, the dimensions of the boat gunnel and the generally experienced water level fluctuation where the dock 10 is located. In this latter regard, in mooring situations with vessels moored in water bodies contiguous to salt water areas where tidal variations are the rule, particularly when mooring larger ships, the vertical positioning of the vertical pillars 20A, 20B . . . 22A and 22B is governed by different parameters and considerations than those applicable with smaller boats or small nontidal water bodies. Again, however, this does not detract from the applicability of the subject invention to such larger docking arrangements.

Each vertical support pillar 20A, 20B, 22A and 22B is preferably composed of a hardened substance such as metal, wood, or possibly a hardened plastic material, as the pillar will be subjected to stresses imposed by the vessel weighing thereagainst during turbulent or rough periods. The support pillars 20A, 20B, 22A and 22B are generally shown as rectangular members, however, it is not essential or critical that this particular configuration be used. For example, cylindrically shaped pillars may be readily used with the subject invention.

The description of the specific mooring apparatus set forth below is directed specifically to one such apparatus and since it will be understood that each support pillar will have a similar mooring apparatus, a description of each will not be undertaken. Referring now to vertical support pillar 20A as shown in FIGS. 1,2,4, and 5, located near the top and bottom respectively are U-shaped shield members 32A and 32B. More specifically, these U-shaped shield members are structured essentially as protective housing members to hold the pulley members 40A and 40B and supportive pulley shafts 36A and 36B, as described in detail below. The one side of the U-shaped housing 32A is integrally affixed to the outer face of the upper portion of the vertical support pillar 20A, as shown, with the open portion of the U-shaped housing directed downwardly. On the other hand, the U-shaped housing 32B affixed on the bottom of support pillar 20A is affixed thereto with the open end facing upwardly, as shown in the drawings. Moreover, it is preferable to affix the lower housing below the water level, although this is not considered essential to the workability of the subject invention.

Mounted within a shaft bearing is rotatable shaft 36A through housing 32A and the upper part of support pillar 20A, as shown. This rotatable shaft 36A is structured for free rotation within such bearings about an axis which is perpendicular to the longitudinal central axis of the dock member 10. However, it is possible to practice the subject invention having such shaft rotate or be oriented in a direction which is parallel to the longitudinal central axis of the dock 10. Located in the lower housing 32B is a similarly affixed shaft, which is also integrally affixed through the housing and the pillar 20A, as represented. Each shaft in the upper and lower housing 36A and 36B is adapted to receive thereon circular pulley members 40A and 40B, respectively. More specifically, pulley 40A is mounted so as to be freely rotatable about said shaft 36A. In similar manner, pulley 40B is rotatably mounted on lower shaft 36B and is oriented in the same direction as upper pulley 40A. Therefore, as can be seen, the vertical support pillar 20A, is equipped with an upper and lower pulley system each of which is freely rotatable relative to one another. Each vertical support pillar for dock 10 is similarly equipped. The line 44 as enclosed within the respective pulleys 40A and 40B is confined outside the vertical support pillar within a space which is within the limits of the respective vertical sides of the vertical support pillar that are perpendicular to the dock.

Referring now to FIGS. 4 and 6, a closed loop line 44 comprised of suitable substances for mooring purposes such as wire, rope, chain or similar material, is placed over the two pulleys 40A and 40B, as shown. This closed loop 44 is drawn tangentially around the upper circumference of the upper pulley 40A and around the bottom circumference of lower pulley 40B as represented. In this latter respect, the circumference or length of the closed loop 44 should be just slightly larger than twice the linear distance between the upper and lower pulleys 40A and 40B so that there is minimal play in the rope to allow some lateral extension from the vertical axis extending through each pulley 40A and 40B.

In the preferred embodiment of the subject invention, the closed loop 44 has a vertically extending portion thereof which is comprised of a longitudinally extending spring 54 which joins ends 50A and 50B of the closed loop 44. Stated alternately, the opposite ends of longitudinally extending spring 54 are attached to connecting buckles 50A and 50B of loop 44 so as to close same in the desired closed relationship, as described and shown. This closed loop 44 is then drawn over the respective pulleys as described, with the spring portion 54 affixed on the loop system. This spring adds an optimal degree of resiliency to the loop system so as to prevent the placement of too much stress or tension on the loop 44 at a given time. A loop line 58 of a length greater than longitudinal spring 54 can be attached between buckle ends 50A and 50B, as shown. In turn a shortened line 62 can be affixed or tied to the boat 14. On the other hand, the boat 14 can be tied directly to one of the buckle ends 50A and 50B, as seen in FIGS. 3 and 6.

In operation, the subject device operates on a simple pulley movement. As water levels rise the boat 14 will rise and that side of loop 44 to which the boat is tied will rise with the boat level and loop 44 will move counterclockwise as shown in FIG. 6. In cases where the water level drops the boat 14 will move down and the loop 44 will adjust accordingly by a clockwise movement. Since the loop 44 will always move with the boat level, it is essentially a closed control system with build-in feedback, and thereby in this constant adjustment process there is no need for one to be constantly adjusting lines.

It must be noted that it is desrable in constructing the preferred embodiment of the subject invention to have more than one vertical support system with its attendant pulley system. In the preferred embodiment two such vertical systems are employed on the same side of dock 10 with identical pulley systems and closed loop systems as shown. One of the vertical pulley systems is used to moor the rear or stern area of the boat, while the other system is used to moor the bow area. In similar fashion the opposite side of the dock 10 is equipped with such vertical pulley systems for mooring boats on the opposite side of the dock as shown and represented in the drawings.

The foregoing description is of only one possible embodiment, of the subject invention and therefore the following description is not to be considered as limiting the scope of the following claims.

I claim:

1. A self-adjusting mooring device for mooring a boat in the water at a fixed dock having lateral sides and a horizontal platform thereon, said device being adapted to allow the boat to rise and fall with the water and comprising in combination:

(a) two vertically extending support members affixed to at least one side of said dock, each said vertically extending support member extending a distance above and below the horizontal platform on said dock, and wherein each such vertically extending support member has lateral vertical sides which are perpendicular to the horizontal platform of the dock;

(b) upper pulley means pivotally mounted on said vertical support member at a level above the horizontal platform;

(c) lower pulley means pivotally mounted at a position on said vertical support member at a position below said horizontal platform;

(d) closed line means rotatably encircling said upper and lower pulley means on each of the vertically extending support members, each said closed line means having a linearly extending spring member positioned linearly in said closed line means joining opposite ends of said closed line means into a closed loop, and wherein said closed line loop means are confined respectively by said upper and lower pulley means and the lateral vertical sides on the respective vertically extending support members upon which each said closed line loop means is positioned and wherein each such closed line loop means is free to move around the respective upper and lower pulley means on each said vertically extending support member;

(e) loop means joining the respective ends of the closed line means at points where the spring member joins the closed line means;

(f) connection means on each said closed line means to connect a portion of the boat to each of said closed line means for mooring said boat to the fixed dock, whereby a boat line is connected directly to each said closed line means and thereby allowing said boat line and the boat to move with the closed line means movement as various water levels dictate.

* * * * *